US012780523B2

(12) United States Patent
Törnblom et al.

(10) Patent No.: US 12,780,523 B2
(45) Date of Patent: Nov. 3, 2026

(54) 3D SHAPED PACKAGING PRODUCT FROM AN AIR-LAID BLANK

(71) Applicant: Stora Enso OYJ, Helsinki (FI)

(72) Inventors: Maria Törnblom, Halmstad (SE); Martin Malmqvist, Halmstad (SE)

(73) Assignee: Stora Enso OYJ, Helsinki (FI)

( * ) Notice: Subject to any disclaimer, the term of this patent is extended or adjusted under 35 U.S.C. 154(b) by 685 days.

(21) Appl. No.: 18/004,503

(22) PCT Filed: Jul. 8, 2021

(86) PCT No.: PCT/IB2021/056120
§ 371 (c)(1),
(2) Date: Jan. 6, 2023

(87) PCT Pub. No.: WO2022/009129
PCT Pub. Date: Jan. 13, 2022

(65) Prior Publication Data

US 2023/0249890 A1 Aug. 10, 2023

(30) Foreign Application Priority Data

Jul. 9, 2020 (SE) .................................... 2050876-8
Jul. 14, 2020 (SE) .................................... 2050888-3

(51) Int. Cl.
*B65D 81/02* (2006.01)
*B31D 5/00* (2017.01)
(Continued)

(52) U.S. Cl.
CPC ........... *B65D 81/022* (2013.01); *B31D 5/006* (2013.01); *B65D 81/3813* (2013.01);
(Continued)

(58) Field of Classification Search
CPC .............. B65D 81/022; B65D 81/3813; D04H 1/5412; D04H 1/425; D04H 1/542;
(Continued)

(56) References Cited

U.S. PATENT DOCUMENTS 3,575,749 A 4/1971 Kroyer
6,509,092 B1 1/2003 Dugan
(Continued)

FOREIGN PATENT DOCUMENTS

CN 115812060 A 3/2023
EP 1446286 A1 8/2004
(Continued)

OTHER PUBLICATIONS

Notice from Swedish Patent Office for corresponding priority application No. SE-2050876-8, mailed on Mar. 17, 2021.
(Continued)

*Primary Examiner* — Alicia J Weydemeyer
*Assistant Examiner* — Laura B Figg
(74) *Attorney, Agent, or Firm* — Greer, Burns & Crain, Ltd.

(57) ABSTRACT

A 3D shaped packaging product (20) for cushioning and/or thermal insulation of packaged goods is formed by hot pressing at an average pressure equal to or below 200 kPa of an air-laid blank (10) comprising natural fibers at a concentration of at least 70% by weight of the air-laid blank (10) and a thermoplastic polymer binder at a concentration selected within an interval of from 4 up to 30% by weight of the air-laid blank (10). The 3D shaped packaging product (20) has a density that is less than four times a density of the air-laid blank (10) and the density of the 3D shaped packaging product (20) is selected within an interval of from 15 to 240 kg/m$^3$. The 3D shaped packaging product (20) maintains at least a significant portion of the porosity of the
(Continued)

air-laid blank (10) even after hot pressing and therefore provides excellent shock absorbing and damping properties and thermal insulation.

22 Claims, 7 Drawing Sheets

(51) Int. Cl.

| | |
|---|---|
| ***B65D 81/38*** | (2006.01) |
| ***D04H 1/425*** | (2012.01) |
| ***D04H 1/541*** | (2012.01) |
| ***D04H 1/542*** | (2012.01) |
| ***D04H 1/58*** | (2012.01) |
| ***D04H 1/732*** | (2012.01) |
| ***D21H 15/10*** | (2006.01) |
| ***D21H 27/10*** | (2006.01) |
| ***D21J 1/08*** | (2006.01) |
| ***D21J 1/20*** | (2006.01) |
| ***D21J 3/00*** | (2006.01) |

(52) U.S. Cl.
CPC ........... *D04H 1/425* (2013.01); *D04H 1/5412* (2020.05); *D04H 1/542* (2013.01); *D04H 1/58* (2013.01); *D04H 1/732* (2013.01); *D21H 15/10* (2013.01); *D21H 27/10* (2013.01); *D21J 1/08* (2013.01); *D21J 1/20* (2013.01); *D21J 3/00* (2013.01); *B31D 2205/0005* (2013.01); *D10B 2505/10* (2013.01)

(58) Field of Classification Search
CPC .......... D04H 1/58; D04H 1/732; B31D 5/006; D21H 15/10; D21H 27/10; D21J 1/08; D21J 1/20; D21J 3/00
See application file for complete search history.

(56) References Cited

U.S. PATENT DOCUMENTS

| | | | | |
|---|---|---|---|---|
| 2010/0190020 | A1 | 7/2010 | Frederiksen et al. | |
| 2016/0355320 | A1* | 12/2016 | Maier-Eschenlohr | B65D 5/5028 |
| 2020/0318292 | A1* | 10/2020 | Aldén | D21H 17/09 |
| 2021/0024706 | A1* | 1/2021 | Mayes | D04H 1/558 |
| 2023/0256702 | A1 | 8/2023 | Törnblom | |

FOREIGN PATENT DOCUMENTS

| | | | | |
|---|---|---|---|---|
| JP | H10235806 | A | 9/1998 | |
| JP | 2003155652 | A | 5/2003 | |
| JP | 2005139582 | A | 6/2005 | |
| WO | 0242070 | A1 | 5/2002 | |
| WO | 03022540 | A1 | 3/2003 | |
| WO | WO-2014142714 | A1 * | 9/2014 | D04H 1/732 |
| WO | 2019193504 | A1 | 10/2019 | |
| WO | 2019209160 | A1 | 10/2019 | |

OTHER PUBLICATIONS

International Search Report from corresponding PCT application No. PCT/IB2021/056120, mailed on Sep. 24, 2021.

* cited by examiner

3D SHAPED PACKAGING PRODUCT FROM AN AIR-LAID BLANK

This application is a U.S. National Phase under 35 U.S.C. § 371 of International Application No. PCT/IB2021/056120 filed Jul. 8, 2021, which claims priority under 35 U.S.C. §§ 119 and 365 to Swedish Application No. 2050876-8 filed Jul. 9, 2020 and to Swedish Application No. 2050888-3 filed Jul. 14, 2020.

TECHNICAL FIELD

The present embodiments generally relate to three dimensional (3D) shaped packaging products, and in particular to such 3D shaped packaging products adapted for cushioning and/or thermal insulation of packaged goods, and methods of producing such 3D shaped packaging products.

BACKGROUND

With growing awareness for the environment and humanly induced climate change, the use of single use plastic items and products has come more and more into question. However, despite this concern the use of these items and products has grown vastly with new trends in lifestyles and consumer habits of the last decade. One reason for this is that more and more goods are transported around the globe and these goods need protection against impact or shock and/or extreme temperatures. A common way of protecting the goods is to include cushioning and/or insulating elements or products, such as inserts of suitable form into the packaging. These can be made from different materials but are typically made from a foamed polymer, of which expanded polystyrene (EPS) is by far cheapest and most common. In some cases, the entire packaging can be made out of EPS. One example is transport boxes for food that have to be kept within specified temperature intervals, such as cold food, e.g., fish, or hot food, e.g., ready meals. EPS is, however, one of the most questioned plastic materials and many brand owners are looking for more sustainable solutions for these packaging applications. Many countries have also begun to take legislative actions against single use plastic items and products, which increases the pressure to find alternative solutions.

More sustainable alternatives to polymer products exist today, such as inserts made by a process known as pulp molding, where a fiber suspension is sucked against a wire mold by vacuum. Another technique for forming such inserts are described in U.S. patent application no. 2010/0190020, European patent no. 1 446 286 and International application no. 2014/142714, which concern hot pressing of porous fiber mats produced by the process called air-laying into 3D structures with matched rigid molds or by membrane molding.

The above exemplified methods, however, give products with a limited ability for shock protection and thermal insulation. There is therefore a demand in the market for 3D shaped packaging products for cushioning and/or thermal insulation of packaged goods and that can be manufactured using more environmentally friendly materials than EPS.

SUMMARY

It is an objective to provide 3D shaped packaging products for cushioning and/or thermal insulation of packaged goods and methods for production of such 3D shaped packaging products.

It is a particular objective to provide such 3D shaped packaging products that can be manufactured from natural fibers.

These and other objectives are met by embodiments of the present invention.

The present invention is defined in the independent claims. Further embodiments of the invention are defined in the dependent claims.

An aspect of the invention relates to a 3D shaped packaging product for cushioning and/or thermal insulation of packaged goods. The 3D shaped packaging product is formed by hot pressing at an average pressure equal to or below 200 kPa of an air-laid blank comprising natural fibers at a concentration of at least 70% by weight of the air-laid blank and a thermoplastic polymer binder at a concentration selected within an interval of from 4 up to 30% by weight of the air-laid blank. The 3D shaped packaging product has a density that is less than four times a density of the air-laid blank and the density of the 3D shaped packaging product is selected within an interval of from 15 to 240 kg/m$^3$.

Another aspect of the invention relates to a method for manufacturing a 3D shaped packaging product for cushioning and/or thermal insulation of packaged goods. The method comprises hot pressing at an average pressure equal to or below 200 kPa of a male tool into an air-laid blank comprising natural fibers at a concentration of at least 70% by weight of the air-laid blank and a thermoplastic polymer binder at a concentration selected within an interval of from 4 up to 30% by weight of the air-laid blank to form the 3D shaped packaging product having a 3D shape at least partly defined by the male tool. The 3D shaped packaging product has a density that is less than four times a density of the air-laid blank and the density of the 3D shaped packaging product is selected within an interval of from 15 to 240 kg/m$^3$.

The present invention relates to 3D shaped packaging products that maintain at least a significant portion of the porosity of the air-laid blank even after hot pressing. This means that the 3D shaped packaging products are highly suitable for cushioning of packaged goods providing excellent shock absorbing and damping properties. The porosity of the 3D shaped packaging products also give these 3D shaped packaging products thermally insulating properties and, therefore, they can be used for storage and/or transport of tempered, such as cold or hot, goods, such as provisions and foodstuff. The 3D shaped packaging products suitable for cushioning and/or thermal protection are additionally made of environmentally friendly natural fibers in clear contrast to prior art foamed inserts made of polystyrene and other polymers.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
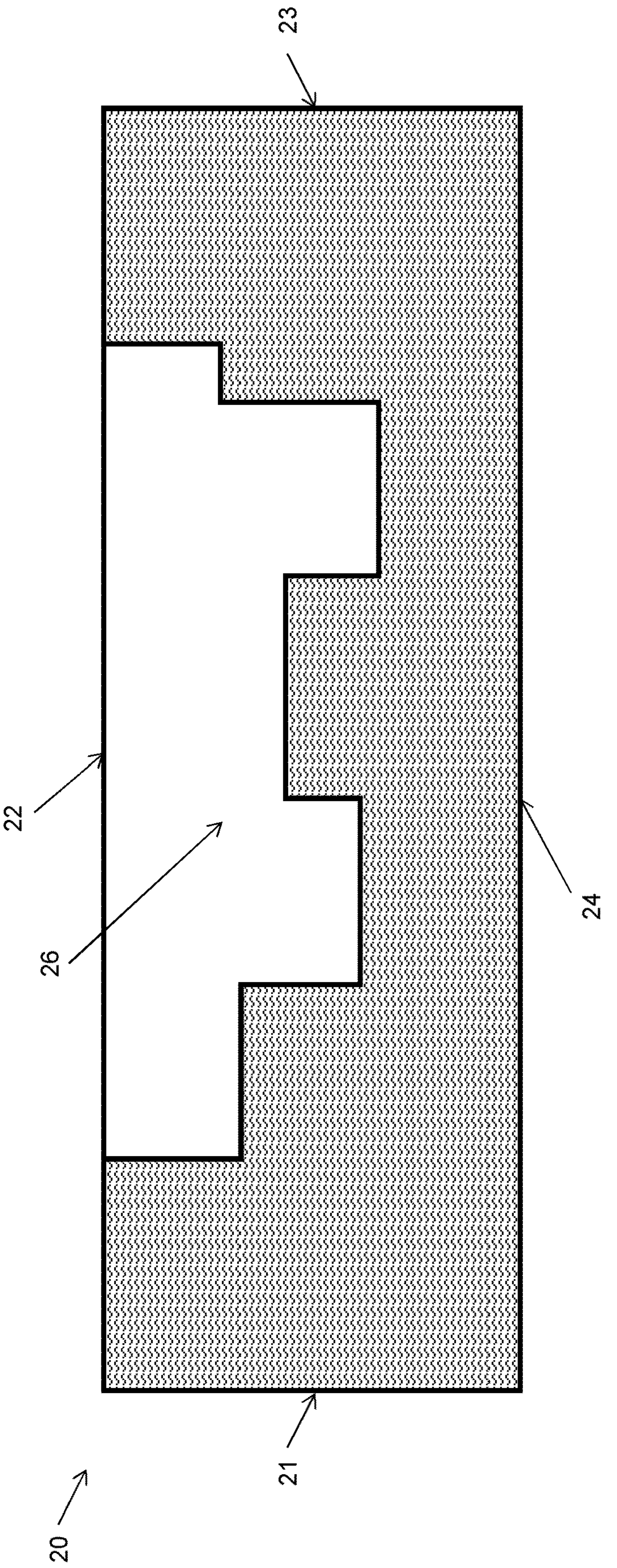
FIG. 1 is an illustrative embodiment of a cross sectional of a 3D shaped packaging product.

The present embodiments generally relate to three dimensional (3D) shaped packaging products, and in particular to such 3D shaped packaging products that are adapted for cushioning and/or thermal insulation of packaged goods, and methods of producing such 3D shaped packaging products.

3D shaped packaging products of the present embodiments are useful as environmentally more friendly replacements to corresponding 3D shaped packaging products made of or from foamed polymers, for instance expanded polystyrene (EPS). More sustainable alternatives to polymer products have been proposed in U.S. patent application no. 2010/0190020, European patent no. 1 446 286 and International application no. 2014/142714, which concern hot pressing of porous fiber mats produced by the process called air-laying into 3D structures with matched rigid molds or by membrane molding. The 3D shaped packaging products produced in the above mentioned documents are, however, dense with thin cross sections and have therefore limited shock absorbing or damping ability and comparatively poor thermal insulation.

The 3D shaped packaging products of the present embodiments are formed by hot pressing of an air-laid blank comprising natural fibers and a binder. An air-laid blank, sometimes also referred to as dry-laid blank, air-laid mat, dry-laid mat, air-laid web or dry-laid web, is formed by a process known as air-laying, in which natural fibers and binders are mixed with air to form a porous fiber mixture deposited onto a support and consolidated or bonded by heating or thermoforming. This air-laid blank is characterized by being porous, having the character of an open cell foam and being produced in a so-called dry forming method, i.e., generally without addition of water. The air-laying process was initially described in U.S. Pat. No. 3,575,749. The air-laid blank may be in the form as produced in the air-laying process. Alternatively, the air-laid blank may be in an at least partly processed form, such as by being cut into a given form prior to hot pressing.

In clear contrast to U.S. patent application no. 2010/0190020, European patent no. 1 446 286 and International application no. 2014/142714, the 3D shaped packaging products of the present embodiments formed from air-laid blanks retain characteristics of the air-laid blanks even after hot pressing and, therefore, have excellent shock absorbing and thermally insulating properties. The 3D packaging products could thereby be produced to have geometries, i.e., 3D shapes, suitable for protection of goods during transport and/or storage. The preservation of the porous character of the air-laid blank starting material means that the 3D shaped packaging products could be used to protect not only consumer goods and products but also heavy equipment against impact. Furthermore, the porous 3D shaped packaging products of the embodiments have improved thermally insulating properties as compared to compact and dense 3D shaped packaging products with thin cross sections. This means that the 3D shaped packaging products can also, or alternatively, be used for storage and/or transport of goods that need to be kept cold, such as cold provisions, or need to be kept hot or warm, such as ready meals.

An aspect of the invention relates to a 3D shaped packaging product 20 for cushioning and/or thermal insulation of packaged goods, see FIG. 1. The 3D shaped packaging product 20 is formed by hot pressing at an average pressure equal to or below 200 kPa of an air-laid blank 10, see FIGS. 3 and 4, comprising natural fibers at a concentration of at least 70% by weight of the air-laid blank 10 and a thermoplastic polymer binder at a concentration selected with in an interval of from 4 up to 30% by weight of the air-laid blank 10. The 3D shaped packaging product 20 has a density that is less than four times a density of the air-laid blank 10 and the density of the 3D shaped packaging product 20 is selected within an interval of from 15 to 240 kg/m$^3$.

The 3D shaped packaging product 20 of the present embodiments is produced from the air-laid blank 10 in a hot pressing process that preserves at least some of the porosity of the air-laid blank 10. Hence, the density of the 3D shaped packaging product 20 is less than four times the density of the air-laid blank 10. The prior art hot pressing processes that produce dense 3D shaped packaging products with thin cross sections typically increase the density of the 3D shaped packaging products with several tens of the density of the air-laid blank, such as 10 to 50 times. The significant increase in density of the prior art 3D shaped packaging products means that most of the porosity of the air-laid blank is lost resulting in a dense and compact fiber structure. The comparatively lower increase in density according to the invention in clear contrast preserves the porous structure of the air-laid blank 10 also in the formed 3D shaped packaging product 20.

The prior art 3D shaped products as disclosed in the above mentioned U.S., European and International applications are produced by subjecting the air-laid blanks to high pressures of at least 1 MPa, such as 1 to 200 MPa and preferably exceeding 20 MPa as disclosed in the International application no. 2014/142714. The high pressures used in the prior art compress the air-laid blanks hard resulting in 3D shaped products having comparatively high densities of 500 to 1000 kg/m$^3$, and in particular above 800 kg/m$^3$. These high densities of the 3D shaped products of the prior art make them less suitable for cushioning packaged goods and storage and unsuitable for transport of tempered goods.

In an embodiment, the average pressure is defined as the applied force divided by the area of the air-laid blank 10 during hot pressing.

Figure 2:
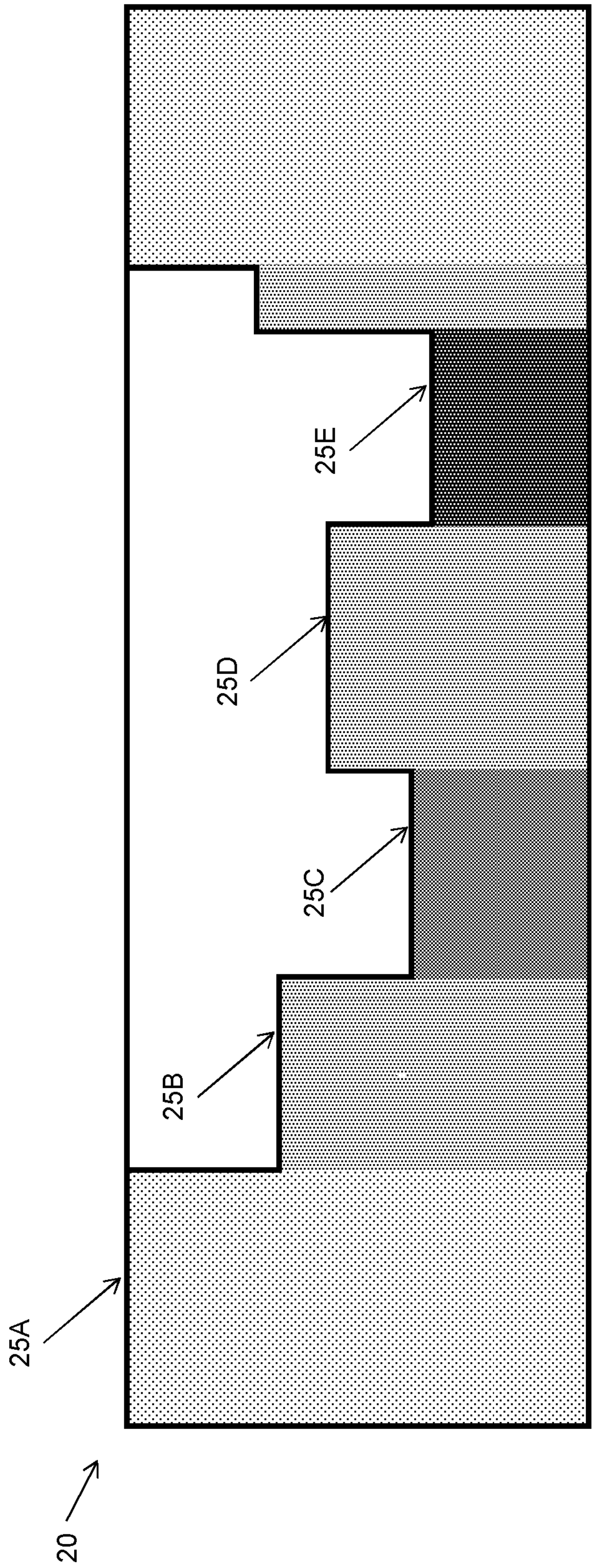
FIG. 2 schematically illustrates the 3D shaped packaging product in FIG. 1 with different densities in different portions of the 3D shaped packaging product.

The density of the 3D shaped packaging product 20 as used herein is the average or mean density of the 3D shaped packaging product 20. This means that the 3D shaped packaging product 20 may contain portions or parts 25A, 25B, 25C, 25D, 25E, see FIG. 2, with different porosity and thereby different densities. This is due to hot pressing different parts of the air-laid blank 10 at different levels or amounts due to the shape of a male tool 30 employed in the hot pressing, see FIGS. 3 and 4. The different densities in the different parts 25A, 25B, 25C, 25D, 25E of the 3D shaped packaging product 20 are schematically shown with different gray scale patterns in FIG. 2. For instance, the parts of the air-laid blank 10 aligned with the protruding structures 32 of the male tool 30 will be pressed and compacted harder as compared to other parts of the air-laid blank 10. As a consequence, the parts 25C, 25E of the 3D shaped packaging product 20 aligned with the protruding structures 32 of the male tool 30 will have higher densities as compared to other parts 25A, 25B, 25D of the 3D shaped packaging product. The density of the 3D shaped packaging product 20 is, however, the average or mean density rather than densities of different parts thereof, and represents the total mass of the 3D shaped packaging product 20 divided by the volume of the 3D shaped packaging product 20 excluding any cavities 26 in the 3D shaped packaging product 20 formed during the hot pressing by the male tool 30 possibly combined with a female tool 50, see FIG. 5.

Hot pressing as used herein indicates that the air-laid blank 10 is exposed to pressure exerted by pressing a male tool 30 or a male tool 30 and a female tool 50 into the air-laid blank 10 while the air-laid blank 10 is heated or exposed to heat. Hence, hot pressing implies that the pressing is done at a temperature above room temperature, preferably at a temperature at which the thermoplastic polymer binder, or at least a portion thereof, is malleable. Hot pressing using heated tools 30, 50 and/or heated air-laid blanks 10 is further described herein in connection with FIGS. 7 and 8.

In an embodiment, the density of the 3D shaped packaging product 20 is equal to or less than three times the density of the air-laid blank 10. In a particular embodiment, the density of the 3D shaped packaging product 20 is equal to or less than twice the density of the air-laid blank 10.

Hence, according to the invention the hot pressing of the air-laid blank 10 leads to an increase in density of the 3D shaped packaging product 20 as compared to the density of the air-laid blank 10 of no more than 300%, preferably no more than 250%, and more preferably no more than 200%, 150% or most preferably of no more than 100%.

The hot pressing, however, preferably causes an increase in the density of the 3D shaped packaging product 20 as compared to the density of the air-laid blank 10 due to hot pressing of the male tool 30 or the male tool 30 and the female tool 50 into the air-laid blank 10. The increase in density caused by the hot pressing is preferably at least 10%, such as at least 12.5%, at least 15%, at least 17.5%, at least 20%, at least 22.5%, at least 25%, or even higher, such as at least 30%, at least 40%, at least 50%, at least 60%, at least 70%, at least 80%, at least 90% or at least 100%.

In various embodiments, the increase in density caused by the hot pressing is at least 12.5% but no more than 300%, such as at least 15% but no more than 275%, at least 17.5% but no more than 250%, at least 20% but no more than 225%, such as least 22.5% but no more than 200%.

In a particular embodiment, no part of the 3D shaped packaging product 20 formed by hot pressing of the air-laid blank 10 has a high density. Hence, the cushioning and/or thermal insulation properties are preferably achieved for all parts of the 3D shaped packaging product 20. In an embodiment, no part of the 3D shaped packaging product 20 has a density that is more than ten times, preferably more than nine times, such as more than eight times, seven times, six times, or five times, and more preferably more than four times, such as three times, or twice, the average density of the air-laid blank 10.

In an embodiment, the density of the air-laid blank 10 is selected within an interval of from 10 to 60 kg/m$^3$.

According to the invention, the density of the 3D shaped packaging product 20 is selected within an interval of from 15 to 240 kg/m$^3$. In a preferred embodiment, the density of the 3D shaped packaging product 20 is selected within an interval of from 15 to 200 kg/m$^3$, preferably within an interval of from 15 to 150 kg/m$^3$ and more preferably within an interval of from 15 to 100 kg/m$^3$. In a particular embodiment, the density of the 3D shaped packaging product 20 is selected within an interval of from 20 to 75 kg/m$^3$, preferably within an interval of from 25 to 70 kg/m$^3$, and more preferably within an interval of from 25 to 65 kg/m$^3$.

In an embodiment, the natural fibers are wood fibers. In a particular embodiment, the natural fibers are cellulose and/or lignocellulose fibers. Hence, in an embodiment, the natural fibers contain cellulose, such as in the form of cellulose and/or lignocellulose, i.e., a mixture of cellulose and lignin. The natural fibers may also contain lignin, such as in the form of lignocellulose. The natural fibers may additionally contain hemicellulose. In a particular embodiment, the natural fibers are cellulose and/or lignocellulose pulp fibers produced by chemical, mechanical and/or chemimechanical pulping of softwood and/or hardwood. For instance, the cellulose and/or lignocellulose pulp fibers are in a form selected from the group consisting of sulfate pulp, sulfite pulp, thermomechanical pulp (TMP), high temperature thermomechanical pulp (HTMP), mechanical fiber intended for medium density fiberboard (MDF-fiber), chemi-thermomechanical pulp (CTMP), high temperature chemi-thermomechanical pulp (HTCTMP), and a combination thereof.

The natural fibers can also be produced by other pulping methods and/or from other cellulosic or lignocellulosic raw materials, such as flax, jute, hemp, kenaf, bagasse, cotton, bamboo, straw or rice husk.

The air-laid blank 10 comprises the natural fibers in a concentration of at least 70% by weight of the air-laid blank 10. In a preferred embodiment, the air-laid blank 10 comprises the natural fibers in a concentration of at least 72.5%, more preferably at least 75%, such as at least 77.5%, at least 80%, at least 82.5%, at least 85% by weight of the air-laid blank 10. In some applications, even higher concentrations of the natural fibers may be used, such as at least 87.5%, or at least 90%, at least 92.5%, at least 95% or at least 96% by weight of the air-laid blank 10.

The thermoplastic polymer binder is included in the air-laid blank 10 as binder that binds the air-laid blank 10 together and preserves its form and structure during use, handling and storage. The thermoplastic polymer binder may also assist in building up the foam-like structure of the air-laid blank 10. The thermoplastic polymer binder is intermingled with the natural fibers during the air-laying process forming a fiber mixture. The thermoplastic polymer binder may be added in the form of a powder, but is more often added in the form of fibers that are intermingled with the natural fibers in the air-laying process. Alternatively, or in addition, the thermoplastic polymer binder may be added as solution, emulsion or dispersion into and onto the air-laid blank 10 during the air-laying process. This latter technique is most suitable for thin air-laid blanks 10.

In a particular embodiment, the thermoplastic polymer binder is selected from the group consisting of a thermoplastic polymer powder, thermoplastic polymer fibers and a combination thereof.

In an embodiment, the thermoplastic polymer binder, or at least a portion thereof, has a softening point not exceeding a degradation temperature of the natural fibers. Hence, the thermoplastic polymer binder, or at least a portion thereof, thereby becomes softened at a process temperature during the hot pressing that does not exceed the degradation temperature of the natural fibers. This means that at least a portion of the thermoplastic polymer binder becomes malleable but preferably not melted, which enables hot pressing while maintaining the porous structure of the air-laid blank 10 at least partly in the 3D shaped packaging product 20 and where the hot pressing is performed at a temperature that does not degrade the natural fibers in the air-laid blank 10.

In an embodiment, the thermoplastic polymer binder is or comprises thermoplastic polymer fibers cut at a fixed length, which are typically referred to as staple fibers. It is generally preferred for the mixing in the air-laying process and, thereby, for the properties of the formed air-laid blank 10 if the length of the thermoplastic polymer fibers is of the same order of magnitude as the length of the natural fibers or longer. Length of the thermoplastic polymer fibers and the natural fibers as referred to herein is length weighted average fiber length. Length weighted average fiber length is calculated as the sum of individual fiber lengths squared divided by the sum of the individual fiber lengths.

In an embodiment, the thermoplastic polymer binder is or comprises thermoplastic polymer fibers having a length weighted average fiber length that is selected within an interval of from 100 up to 600%, preferably from 125 up to 500%, and more preferably from 150 up to 450% of a length weighted average fiber length of the natural fibers. In a particular embodiment, the thermoplastic polymer binder is or comprises thermoplastic polymer fibers having a length weighted average fiber length that is selected within an interval of from 200 up to 400%, preferably within an interval of from 250 up to 350% of a length weighted average fiber length of the natural fibers. In a particular embodiment, the thermoplastic polymer fibers have a length weighted average fiber length within an interval of from 1 up to 12 mm, such as within an interval of from 1 up to 10 mm, preferably within an interval of from 2 up to 8 mm and more preferably within an interval of from 2 up to 6 mm.

The length weighted average fiber length of the natural fibers is dependent on the source of the natural fibers, such as tree species they are derived from, and the pulping process. A typical interval of length weighted average fiber length of wood pulp fibers is from about 0.8 mm up to about 5 mm.

In an embodiment, the thermoplastic polymer binder is or comprises mono-component and/or bi-component thermoplastic polymer fibers. Bi-component thermoplastic polymer fibers, also known as bico fibers, comprise a core and sheath structure, where the core is made of a first polymer, copolymer and/or polymer mixture and the sheath is made of a second, different polymer, copolymer and/or polymer mixture.

In an embodiment, the thermoplastic polymer binder is or comprises, such as consists of, bi-component polymer fibers comprising a core component made of a material having a melting temperature above a temperature at which the air-laid blank 10 is heated during hot pressing of the air-laid blank 10. The bi-component polymer fibers also comprise a sheath component made of a material having a melting temperature below the temperature at which the air-laid blank 10 is heated during hot pressing of the air-laid blank 10.

In this embodiment, the core component of the bi-component polymer fibers has a melting temperature that is higher than the melting temperature of the sheath component of the bi-component polymer fibers. In addition, the melting temperature of the core component is above the process temperature at which the air-laid blank is heated during the hot pressing, whereas the melting temperature of the sheath component is below this process temperature. This means that the core component will not melt but advantageously becomes malleable during the hot pressing, whereas the sheath component will melt or at least be significantly tackified. The sheath component will thereby adhere to natural fibers while the non-melted but malleable core component provides structural support. Such bi-component polymer fibers achieve both good attachment to the natural fibers while simultaneously maintaining the porous structure of the air-laid blank even during hot pressing.

In an embodiment, the thermoplastic polymer binder is or comprises, such as consists of, mono-component thermoplastic polymer fibers made of i) a material selected from the group consisting of polyethylene (PE), ethylene acrylic acid copolymer (EAA), ethylene-vinyl acetate (EVA), polypropylene (PP), polystyrene (PS), polybutylene adipate terephthalate (PBAT), polybutylene succinate (PBS), polylactic acid (PLA), polyethylene terephthalate (PET), polycaprolactone (PCL), copolymers thereof and mixtures thereof, and ii) optionally one or more additives.

Hence, in an embodiment, the thermoplastic polymer fibers are made of a material selected from the above mentioned group. In another embodiment, the thermoplastic polymer fibers are made of a material selected from the above mentioned group and one or more additives.

In another embodiment, the thermoplastic polymer binder is or comprises, such as consists of, bi-component thermoplastic polymer fibers having a core and/or sheath made of i) a material or materials selected from the group consisting of PE, EAA, EVA, PP, PS, PBAT, PBS, PLA, PET, PCL, copolymers thereof and mixtures thereof, and ii) optionally one or more additives. In a further embodiment, the thermoplastic polymer binder is or comprises, such as consists of, a combination or mixture of mono-component thermoplastic polymer fibers made of i) a material selected from the group consisting of PE, EAA, EVA, PP, PS, PBAT, PBS, PLA, PET, PCL, copolymers thereof and mixtures thereof, and ii) optionally one or more additives, and bi-component thermoplastic polymer fibers having a core and/or sheath made of i) a material or materials selected from the group consisting of PE, EAA, EVA, PP, PS, PBAT, PBS, PLA, PET, PCL, copolymers thereof and mixtures thereof, and ii) optionally one or more additives.

The thermoplastic polymer binder could be made of a single type of thermoplastic polymer fibers, i.e., made of a same material in the case of mono-component thermoplastic polymer fibers or made of the same material or materials in the case of bi-component thermoplastic polymer fibers. However, it is also possible to use a thermoplastic polymer binder made of one or multiple, i.e., two or more, different mono-component thermoplastic polymer fibers made of different materials and/or one or multiple different bi-component thermoplastic polymer fibers made of different materials.

In an embodiment, the thermoplastic polymer binder is or comprises a thermoplastic polymer powder made of i) a material selected from the group consisting of PE, EAA, EVA, PP, PS, PBAT, PBS, PLA, PET, PCL, copolymers thereof and mixtures thereof, and ii) optionally one or more additives.

It is also, as mentioned in the foregoing, possible to use a thermoplastic polymer binder that is a combination of thermoplastic polymer fibers and thermoplastic polymer powder.

Particular examples of material for the thermoplastic polymer binder that could be used according to the present embodiments include PBAT, PBS, PLA, PCL, copolymers thereof and mixtures thereof. In such a case, the thermoplastic polymer binder made of these materials is compostable under industrial conditions.

Generally, air-laid blanks and 3D shaped packaging products made there from can be recycled if they can be disintegrated in an opener for this specific purpose and run through the air-laying process again with the possible addition of additional binder. This is in reality only possible for edge trim and other process rejects that are recycled in-house within the production facility. For consumers and other end users, this is not an option since there is no air-laying process in existing recycling schemes. A much better option would be if the products produced by or from air-laying could be sorted into one of the existing recycling fractions, for which there are already functioning collection and recycling systems. Since the majority of the material is made up of wood fibers that could go into a paper or board making process these would be the natural, existing, fractions to collect the air-laid blanks and 3D shaped packaging products with. With printing papers sensitive to impurities that can cause faults in the printing process or dark specs in the paper, the board fraction would typically be the better option. Recycled board is often used for mid-plies in box boards with several layers or fluting in corrugated board. These are less sensitive to impurities, even those that decrease the strength of the recycled material.

A prerequisite for a material to be recyclable as board is that it is repulpable i.e., that most of it will disintegrate into separate fibers when sheared with water in a repulping process and, thus, pass the following screening to give a good yield of usable pulp. The conventional thermoplastic binders used for air-laid blanks attach too well to the cellulose and/or lignocellulose fibers. Hence, these thermoplastic polymer binders prevent disintegration to a degree that makes the yield of the repulping process far too low to be economically useful.

The thermoplastic polymer materials with high tackiness and low melting points that are often used for mono-component fibers and the sheath of bi-component fibers present an additional problem in board recycling. These may turn into stickies and render the material classified as unsuitable for recycling in the repulping process. One way to solve both these problems would be to use a binder that will dissolve in the water of the repulping process i.e., is water soluble at the repulping temperature. At the same time the binder would need to be thermoplastic with a melting point that does not exceed the degradation temperature of the natural fibers and it should have a very good adhesion to the natural fibers after being heated and cooled again. Furthermore, the binder should not have detrimental effects in the board-making process. It is also an advantage if they are safe to use in food contact applications.

"Repulpability" and "recyclability" in paper or board processes are most widely tested using the PTS-method PTS-RH 021/97 from the German Papiertechnische Stiftung. For board products, the PTS-method tests the recyclability in two steps, where the first is a repulpability test. In the repulpability test, 50 g of material is disintegrated in a standard disintegrator for 20 min at conditions as specified in PTS-method PTS-RH 021/97. The undispersed residue is screened out and its weight is determined. If the weight of this undispersed residue corresponds to less than 20% of the original weight (50 g), the material is classified as "recyclable". If the weight of the undispersed residue is 20-50% of the original weight, the material is classified as "recyclable but worthy of product design improvement". The second part of the PTS-method PTS-RH 021/97 for board products is a test for impurities, especially substances that become extremely tacky when heated, in the test to 130° C. In the board making process, such sticky or tacky substances can attach to machine fabrics and other essential parts of the board machine and cause runability problems and the need for extended, costly, cleaning stoppages. In the paper and board industry, this type of impurities is usually called "stickies". The presence of such stickies in the unscreened, disintegrated sample render the material classified as "non-recyclable due to stickies". The presence of other impurities can restrict the usability of the recycled pulp acquired from the material but is not considered totally detrimental.

Hence, in an embodiment, the thermoplastic polymer binder, or at least a part thereof, is water soluble at a repulping temperature selected for repulping the 3D shaped packaging product 20. In such a case, the 3D shaped packaging product 20 could be recycled in a repulping process as mentioned above. Water soluble as used herein implies that the thermoplastic polymer binder dissolves or disperses in water during the repulping process. For instance, the thermoplastic polymer binder may dissolve or disperse in water at the repulping temperature of the repulping process, i.e., forms a solution or colloidal dispersion, in which the thermoplastic polymer binder exists as single molecules and/or form colloidal aggregates. Water soluble as used herein implies, in an embodiment, a solubility of more than 0.5 g thermoplastic polymer binder per 100 ml water, preferably at least 1 g thermoplastic polymer binder per 100 ml water, and more preferably at least 5 g thermoplastic polymer binder per 100 ml water, such as at least 10 g thermoplastic polymer binder per 100 ml water. Hence, in an embodiment, the at least a part of the thermoplastic polymer binder that is water soluble preferably has water solubility in accordance with above.

Examples of such water soluble thermoplastic polymer binders are mono-component and/or bi-component thermoplastic polymer fibers made of i) a material selected from the group consisting of polyvinyl alcohol (PVA), polyethylene glycol (PEG), poly(2-ethyl-2-oxazoline) (PEOX), polyvinyl ether (PVE), polyvinylpyrrolidone (PVP), polyacrylic acid (PAA), polymethacrylic acid (PMAA), copolymers thereof and mixtures thereof, and ii) optionally one or more additives.

In an embodiment, the thermoplastic polymer binder is or comprises, such as consists of, mono-component thermoplastic polymer fibers made of i) a material selected from the group consisting of PVA, PEG, PEOX, PVE, PVP, PAA, PMAA, copolymers thereof and mixtures thereof, and ii) optionally one or more additives. In another embodiment, the thermoplastic polymer binder is or comprises, such as consists of, bi-component thermoplastic polymer fibers having a sheath or a sheath and core made of i) a material or materials selected from the group consisting of PVA, PEG, PEOX, PVE, PVP, PAA, PMMA, copolymers thereof and mixtures thereof, and ii) optionally one or more additives. In a particular embodiment, at least the sheath of the bi-component thermoplastic polymer fibers is made of i) a material selected from the group consisting of PVA, PEG, PEOX, PVE, PVP, PAA, PMAA, copolymers thereof and mixtures thereof, and ii) optionally one or more additives. In such a particular embodiment, also the material of the core of the bi-component thermoplastic polymer fibers could be selected from this group. However, if the core of the bi-component thermoplastic polymer fibers does not soften to become tacky and attach to the natural fibers in the hot pressing the core may actually be made of a material that is not necessarily water soluble at the repulping temperature.

This means that the core could be made of the previously mentioned thermoplastic polymer materials. Hence, in this particular embodiment, the bi-component thermoplastic polymer fibers comprise a core component made of i) a material selected from the group consisting of polyethylene PE, EAA, EVA, PP, PS, PBAT, PBS, PLA, PET, PCL, copolymers thereof and mixtures thereof, and ii) optionally one or more additives, and a sheath component made of i) a material selected from the group consisting of PVA, PEG, PEOX, PVE, PVP, PAA, PMAA, copolymers thereof and mixtures thereof, and ii) optionally one or more additives. In a further embodiment, the thermoplastic polymer binder is or comprises, such as consists of, a combination of mono-component thermoplastic polymer fibers made of i) a material selected from the group consisting of PVA, PEG, PEOX, PVE, PVP, PAA, PMAA, copolymers thereof and mixtures thereof, and ii) optionally one or more additives, and bi-component thermoplastic polymer fibers having a core and/or sheath made of i) a material or materials selected from the group consisting of PVA, PEG, PEOX, PVE, PVP, PAA, PMAA, copolymers thereof and mixtures thereof, and ii) optionally one or more additives.

In an embodiment, the thermoplastic polymer binder is or comprises a thermoplastic polymer powder made of i) a material selected from the group consisting of PVA, PEG, PEOX, PVE, PVP, PAA, PMAA, copolymers thereof and mixtures thereof, and ii) optionally one or more additives.

In a particular embodiment, the air-laid blank 10 and preferably the 3D shaped packaging product 20 is repulpable or recyclable preferably as defined according to the PTS-method PTS-RH 021/97 from the German Papiertechnische Stiftung. Hence, in a particular embodiment, the air-laid blank 10 and preferably the 3D shaped packaging product 20 results in less than 50% (w/w), preferably less than 20% (w/w) of undispersed residue following disintegration of 50 g of the air-laid blank 10 or 3D shaped packaging product 20 in a standard disintegrator for a 20 min at conditions as specified in PTS-method PTS-RH 021/97.

The repulping temperature used in the repulping process is typically within the range of from 20 to 100° C., such as within the range of from 30 to 90° C., and typically within the range of from 30 to 70° C. Hence, in an embodiment, at least a part of the thermoplastic polymer binder is water soluble at a temperature selected within an interval of from 20 to 100° C., preferably within an interval of from 30 to 90° C., and more preferably within an interval of from 30 to 70° C. In a particular embodiment, the temperature of water used in the repulping process is about 40° C. in accordance with the PTS-method PTS-RH 021/97. Hence, in an embodiment, at least a part of the thermoplastic polymer binder is water soluble at 40° C.

In more detail, the PTS-method PTS-RH 021/97 comprises disintegrating the specimens in line with DIN EN ISO 5263-1:2004-12, but using tap water of 40° C. The dilution water is poured over the sample material, which are placed in the disintegrator (Standard disintegrator to DIN EN ISO 5263-1:2004-12) without pre-swelling. The sample material is disintegrated at a consistency of 2.5% o.d. corresponding to a weighed-in amount of 50 g o.d. and a slurry volume of 21. The disintegration period is 20 min (60,000 revolutions). After disintegrating, the pulp (total stock) is completely transferred to a standard distributor (Standard distributor to ZELLCHEMING Technical Information Sheet ZM V/6/61) and diluted with tap water to a total volume of 10 I, which corresponds to 0.5% consistency. The screening is conducted in line with ZELLCHEMING Technical Information Sheet ZM V/18/62 using a perforated plate of 0.7 mm hole diameter. The test device is set to the "low stroke" mode. A test portion of the slurry corresponding to 2 g o.d. (400 ml) is taken out of the distributor and diluted to a total volume of 1000 ml, which is filled into the fractionator during 30 s and screened for 5 min at a washing water pressure of 0.3 bar. After 5 min, the water supply and the membrane displacement motor are cut off. The valve on the retaining ring is opened to drain the water, which has gathered below the test chamber. The locking screw is loosened and the test chamber is tilted upwards. The rear nozzles are covered with one hand to prevent water from dripping onto the unprotected perforated plate with the residue on it. The residue from the perforated plate is washed into a 2 I tank and dewatered through a filter inserted in a Büchner funnel. The filter is folded once and placed in the dryer to dry at 105° C. up to weight constancy. Products are rated as "recyclable" if the disintegration residue does not exceed 20% in relation to the input and rated as "recyclable, but worthy of product design improvement" if the disintegration residue is from 20% to 50% of the input.

In an embodiment, the air-laid blank 10 comprises the thermoplastic polymer binder at a concentration selected within an interval of from 10 up to 30%, such as from 15 up to 30% by weight of the air-laid blank 10. In a particular embodiment, the air-laid blank 10 comprises more than 15% but no more than 30% by weight of the thermoplastic polymer binder. For instance, the air-laid blank 10 comprises the thermoplastic polymer binder at a concentration selected within an interval of from 15 or 17.5 up to 30% by weight of the air-laid blank 10. In a particular embodiment, the air-laid blank 10 comprises the thermoplastic polymer binder at a concentration selected within an interval of from 15 or 17.5 up to 25%, such as from 20 up to 25% by weight of the air-laid blank 10.

In some applications, it may be advantageous to have a comparatively higher concentration of the thermoplastic polymer binder, such as more than 15% by weight of the air-laid blank 10, in order to preserve the integrity and foam-like structure of the air-laid blank 10 even when pressing the air-laid blank 10 at a lower pressure to obtain the porous 3D shaped packaging product 20. Thus, if too low concentration of thermoplastic polymer binder is included, i.e., below 4% by weight of the air-laid blank 10, the formed 3D shaped packaging product 20 may unintentionally disintegrate or fall apart since the combination of too low concentration of the thermoplastic polymer binder and a "soft" hot pressing of the air-laid blank 10 is not sufficient to keep the structure of the 3D shaped packaging product 20.

In some embodiments, the air-laid blank 10 comprises the thermoplastic polymer binder at a concentration selected within an interval of from 4 up to 15% by weight of the air-laid blank 10, preferably within an interval of from 5 up to 15% by weight or the air-laid blank 10, or within an interval of from 7.5 up to 15% by weight of the air-laid blank 10, and more preferably within an interval of from 10 up to 15% by weight of the air-laid blank 10. These embodiments are, in particular, suitable for usage with thermoplastic polymer binders that are water soluble at a repulping temperature selected for repulping the 3D shaped packaging product, e.g., for usage with thermoplastic polymer fibers made from i) a material or materials selected from the group consisting of PVA, PEG, PEOX, PVE, PVP, PAA, PMAA, copolymers thereof and mixtures thereof, and ii) optionally one or more additives.

In an embodiment, the air-laid blank 10 has a thickness of at least 20 mm, preferably at least 30 mm and more preferably at least 40 mm, or even thicker, such as at least 50 mm, at least 60 mm, at least 70 mm, at least 80 mm or at least 90 mm. In a particular embodiment, the air-laid blank 10 has a thickness of at least 100 mm, such as at least 150 mm, at least 200 mm, or at least 250 mm. It is also possible to have very thick air-laid blanks 10 having a thickness of at least 300 mm. Hence, the present embodiments preferably use rather thick air-laid blanks 10 to obtain 3D shaped packaging products 20 suitable for cushioning and/or thermal insulation even after hot pressing. The thickness of the air-laid blank 10 may be selected based on the particular use of the resulting 3D shaped packaging product 20, such as based on the cushioning and/or isolation requirements for the 3D shaped packaging product 20 and/or based on the geometries of the packaged goods that are to be protected by the 3D shaped packaging product 20.

Correspondingly, the 3D shaped packing product 20 could have a thickness of at least 10 mm, preferably at least 15 mm, such as at least 20 mm or at least 25 mm, and more preferably at least 30 mm, such as at least 35 mm, or at least 40 mm, or even thicker, such as at least 45 mm or at least 50 mm. According to the present invention, a low average pressure, i.e., equal to or below 200 kPa, is used when hot pressing the air-laid blank 10 into the 3D shaped packaging product 20. This low average pressure preserves a significant portion of the thickness of the air-laid blank 10. The hot pressing of the air-laid blank 10 may, as is further described herein, compress different portions of the air-laid blank 10 differently hard. Hence, some portions of the 3D shaped packaging product 20 may have a thickness that is substantially the same or merely slightly less than the thickness of the air-laid blank 10. In a particular embodiment, at least those portions of the 3D shaped packaging product 20 that will be in contact with the goods to be protected preferably have the above mentioned thicknesses.

In an embodiment, the 3D shaped packaging product 20 is configured to protect the packaged goods from electrostatic discharge (ESD). In such an embodiment, the air-laid blank 10 is electrically conducting or semiconducting. For instance, the air-laid blank 10 could comprise an electrically conducting polymer or electrically conducting fibers to make the air-laid blank 10 and, thereby, the 3D shaped packaging product 20 formed by hot pressing the air-laid blank 10, electrically conducting or semiconducting. In such a case, the air laid blank 10 preferably comprises the electrically conducting polymer or fibers at a concentration of no more than 10% by weight of the air-laid blank 10, and more preferably of no more than 5% by weight of the air-laid blank 10. In an embodiment, a portion of the natural fibers may be replaced with electrically conducting polymer or fibers. In another embodiment, the binder is made of, or comprises, an electrically conducting polymer. In a further embodiment, these two embodiments are combined. In a particular embodiment, the electrically conducting polymer or fibers are carbon fibers. Instead of, or as a complement to, having electrically conducting polymer or fibers, the air-laid blank 10 could comprise an electrically conducting or semiconducting fillers, such as carbon black, which, for instance, could be in the form of an additive to the binder.

The air-laid blank 10 may, thus, comprise one or more additives in addition to the natural fibers and the thermoplastic polymer binder. One or more additives could be added to the thermoplastic polymer binder and/or added when producing the thermoplastic polymer binder. Alternatively, or in addition, one or more additives could be added to the natural fibers. Alternatively, or in addition, one or more additives could be added to the natural fibers and the thermoplastic polymer binder, such as during the air-laying process.

Illustrative, but non-limiting, examples of such additives include electrically conducting or semiconducting fillers, coupling agents, flame retardants, dyes, impact modifiers, etc.

In some applications, it may be desirable to seal some or all of the surfaces of the 3D shaped packaging product 20, such as by heat, to prevent linting from the surface(s) onto the packaged goods. Surfaces that are processed with heat in the hot pressing will be sealed and do not need any additional (heat) sealing. The at least one surface to be sealed can be sealed, such as by heat, before or after the hot pressing operation. Hence, in an embodiment, the 3D shaped packaging product 20 comprises at least one surface 21, 23 that is heat sealed to inhibit linting from the at least one surface 21, 23. FIG. 1 illustrates a 3D shaped packaging product 20 having an upper surface 22, a bottom surface 24 and two end surfaces 21, 23. A 3D shaped cavity 26 is formed in the upper surface 22 in the hot pressing to thereby impart a 3D shape of the 3D shaped packaging product 20. The end surfaces 21, 23 may then be unprocessed from the air-laid blank 10 or may have been produced by sawing, cutting or stamping the air-laid blank 10 to produce these end surfaces 21, 23. In such a case, it may be preferred to heat seal these surfaces 21, 23 to prevent or at least suppress or inhibit linting. The upper surface 22, or at least a portion thereof, has been hot pressed so no heat sealing thereof is generally needed. Heat sealing of the bottom surface 24 may be applied depending on whether the bottom surface of the air-laid blank 10 has been exposed to any heat during the hot pressing.

In some applications, the 3D shaped packaging product 20, or at least a portion thereof, can be laminated with a surface layer, such as a thermoplastic polymer film or non-woven textile. This can both prevent linting and add additional functions to the surface, such as moisture barriers, haptic properties, color and designs. The film or non-woven could be made from any common thermoplastic polymer. Examples include the previously mentioned thermoplastic polymer materials for usage as thermoplastic polymer binders. This layer could be heat laminated or extruded to the air-laid blank 10 and/or laminated directly onto the 3D shaped packaging product 20. In an embodiment, the film laminated to at least one surface, or a portion thereof, of the 3D shaped packaging product 20 is electrically conducting or semiconducting to provide ESD protection of the packaged goods.

Hence, in an embodiment, the 3D shaped packaging product 20 comprises at least one surface coated with a surface layer selected from the group consisting of a linting inhibiting layer, a moisture barrier layer, a haptic layer and a colored layer.

The film, textile or surface layer may be attached to the air-laid blank 10 or the 3D shaped packaging product 20 by help of a thin layer of a hotmelt glue, by an additional adhesive film or by its own having become semi-melted and tacky during the heat lamination process. This operation can be performed before, after or simultaneously with the hot pressing operation. If the lamination is performed on at least one surface of the air-laid blank 10, which is later to be processed by hot pressing, the softening point of the surface laminate should not exceed the degradation temperature of the natural fibers of the air-laid blank 10.

In further embodiments, it is possible to apply the surface layer by spraying it onto surface(s) of the 3D shaped packaging product 20 or the air-laid blank 10. The layer may then contain any substances that can be prepared as solutions, emulsions or dispersions, such as thermoplastic polymers; natural polymers, such as starch, agar, guar gum or locust bean gum, microfibrillar or nanofibrilar cellulose or lignocellulose or mixtures thereof. The surface layer may in addition comprise other substances, such as emulsifying agents, stabilizing agents, electrically conductive agents, etc. that provide additional functionalities to the surface layer and the 3D shaped packaging product 20.

Any hot pressing operation performed after providing a surface layer should preferably be performed at a temperature where the surface layer is in a semi-melted or malleable state but not in a melted stage. If the hot pressing is conducted at a too high temperature at which the surface layer is in a melted stage, the surface layer might delaminate from the surface and the natural fibers may in addition start to degrade if the temperature exceeds their degradation temperature(s).

Another aspect of the embodiments relates to a method for manufacturing a 3D shaped packaging product 20 for cushioning and/or thermal insulation of packaged goods, see FIGS. 3 to 8. The method comprises hot pressing, in step S1, of a male tool 30 at an average pressure equal to or below 200 kPa into an air-laid blank 10 comprising natural fibers at a concentration of at least 70% by weight of the air-laid blank 10 and a thermoplastic polymer binder at a concentration selected within an interval of from 4 up to 30% by weight of the air-laid blank 10 to form the 3D shaped packaging product 20 having a 3D shape at least partly defined by the male tool 30. The 3D shaped packaging product 20 has a density that is less than four times a density of the air-laid blank 10 and the density of the 3D shaped packaging product 20 is selected within an interval of from 15 to 240 kg/m$^3$.

The discussions above regarding various embodiments of, among others, the densities of the 3D shaped packaging product 20 and the air-laid blank 10, thickness of the 3D shaped packaging product 20 and the air-laid blank 10 also apply to the method for manufacturing a 3D shaped packaging product 20.

Step S1 of FIG. 7 comprises hot pressing of the male tool 30 into the air-laid blank 10 at an average pressure equal to or below 200 kPa. In a particular embodiment, the male tool 30 is hot pressed into the air-laid blank 10 at a pressure equal to or below 175 kPa, and more preferably equal to or below 150 kPa. In an embodiment, the average pressure is defined as the applied force divided by the area of the air-laid blank 10 during hot pressing.

Figure 7:
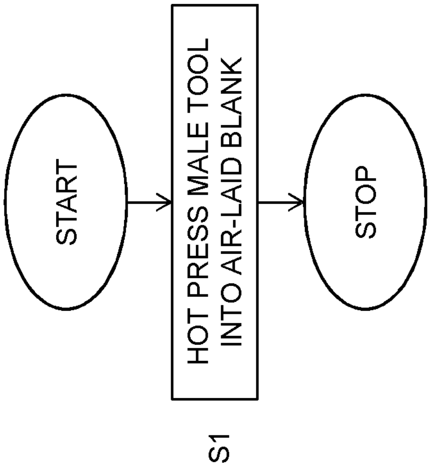
FIG. 7 is a flow chart illustrating a method for manufacturing a 3D shaped packaging product for cushioning and/or thermal insulation of packaged goods according to an embodiment.

In an embodiment, step S1 in FIG. 7 comprises hot pressing of a heated male tool 30 into the air-laid blank 10. In this embodiment, the heated male tool 30 is preferably heated to a temperature selected within an interval of from 120° C. up to 210° C., preferably within an interval of from 120° C. up to 190° C. Hence, in this embodiment, the heating of the air-laid blank 10 is achieved by usage of a heated male tool 30. The male tool 30 may then comprise heating elements 38 that are preferably controllable heating elements 38 to heat the male tool 30 to a desired temperature for hot pressing. The temperature of the male tool 30 typically depends on the type of natural fibers and the thermoplastic polymer binder in the air-laid blank 10 and the cycle time of the hot pressing in step S1. However, the above presented interval is suitable for most combinations of natural fibers, thermoplastic polymer binders and cycle times.

Figure 3:
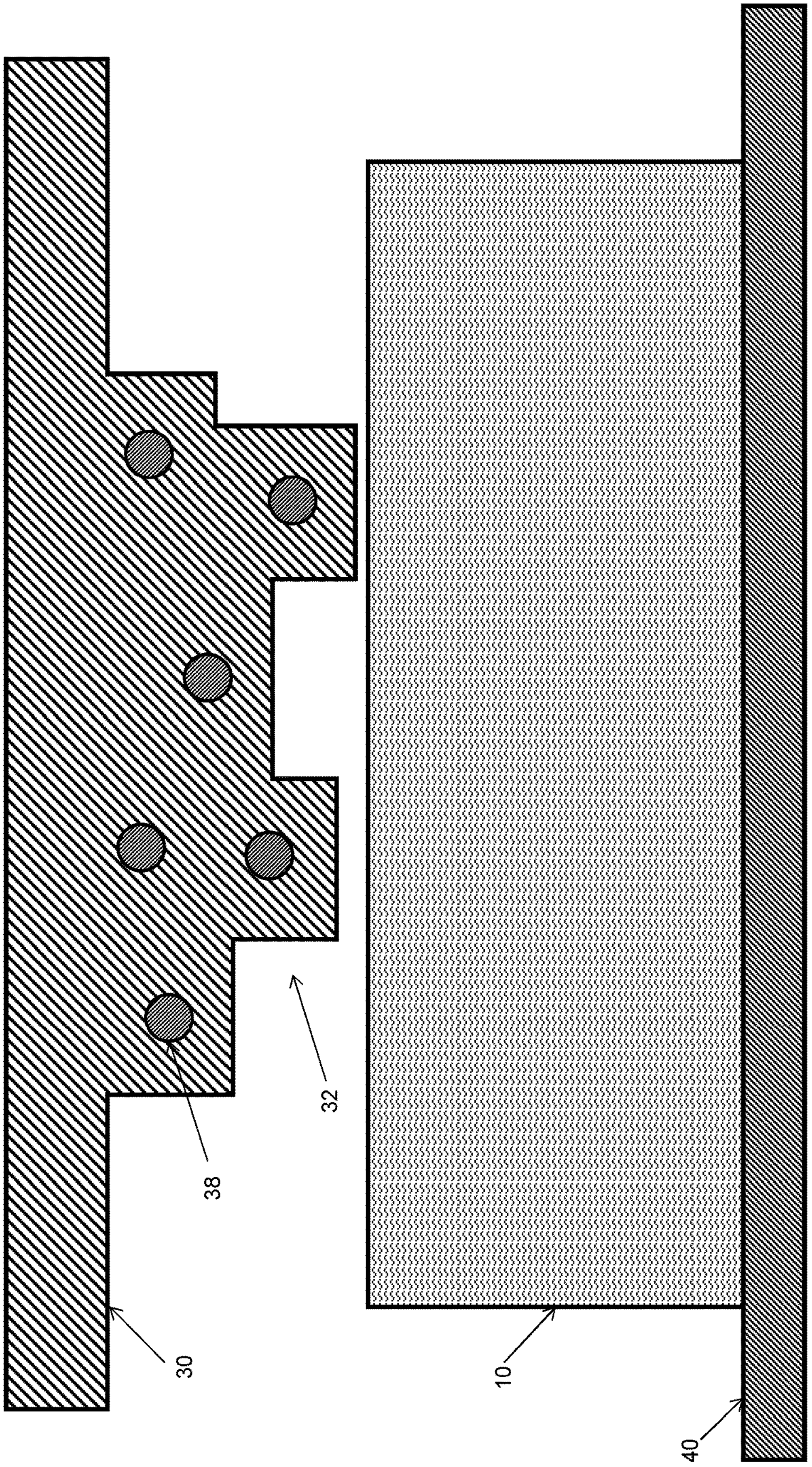
FIG. 3 schematically illustrates hot pressing of an air-laid blank to form the 3D shaped packaging product shown in FIG. 1 prior to a male tool engaging the air-laid blank to produce a cavity.
Figure 4:
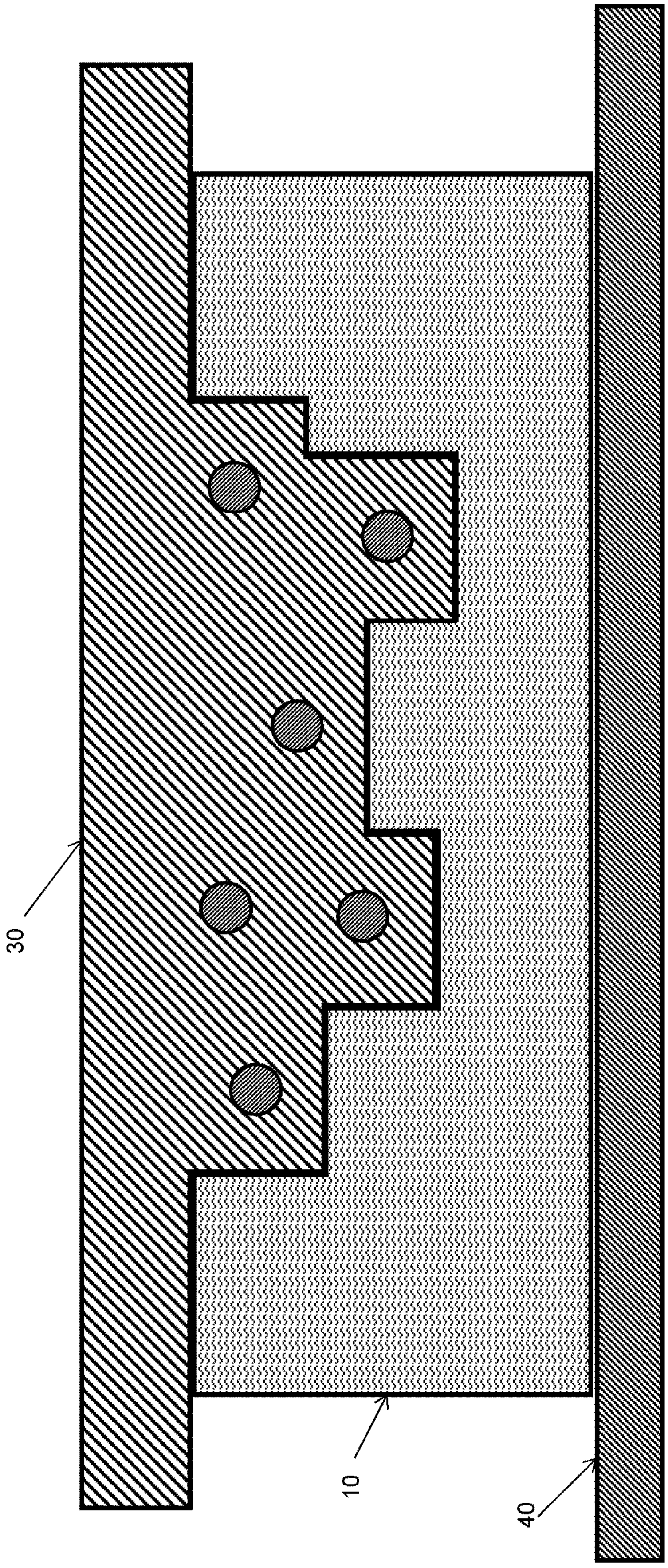
FIG. 4 schematically illustrates hot pressing of an air-laid blank to form the 3D shaped packaging product shown in FIG. 1 when a male tool engages the air-laid blank.

In an embodiment, the air-laid blank 10 is positioned on a base platen 40 as shown in FIGS. 3 and 4. In an embodiment, step S1 in FIG. 7 comprises hot pressing of the heated male tool 30 into the air-laid blank 10 positioned on a base platen 40 having a temperature equal to or below ambient temperature.

In these embodiments, the heating of the air-laid blank 10 is achieved by the male tool 30, whereas the base platen 40 is at ambient temperature, typically room temperature, or may even be cooled. Having a base platen 40 at ambient temperature or even cooled may reduce the risk of heating the air-laid blank 10 too much during the hot pressing in step S1, which otherwise may have negative consequences of degrading the natural fibers, melting the thermoplastic polymer binder and destroying the porous structure of the air-laid blank 10 and the formed 3D shaped packaging product 20.

It is, though, possible to have the air-laid blank 10 positioned on a heated base platen 40 during the hot pressing in step S1 even in combination with a heated male tool 30. In such a case, also the underside of the air-laid blank 10 facing the heated base platen 40 will be heat sealed during the hot pressing.

Figure 5:
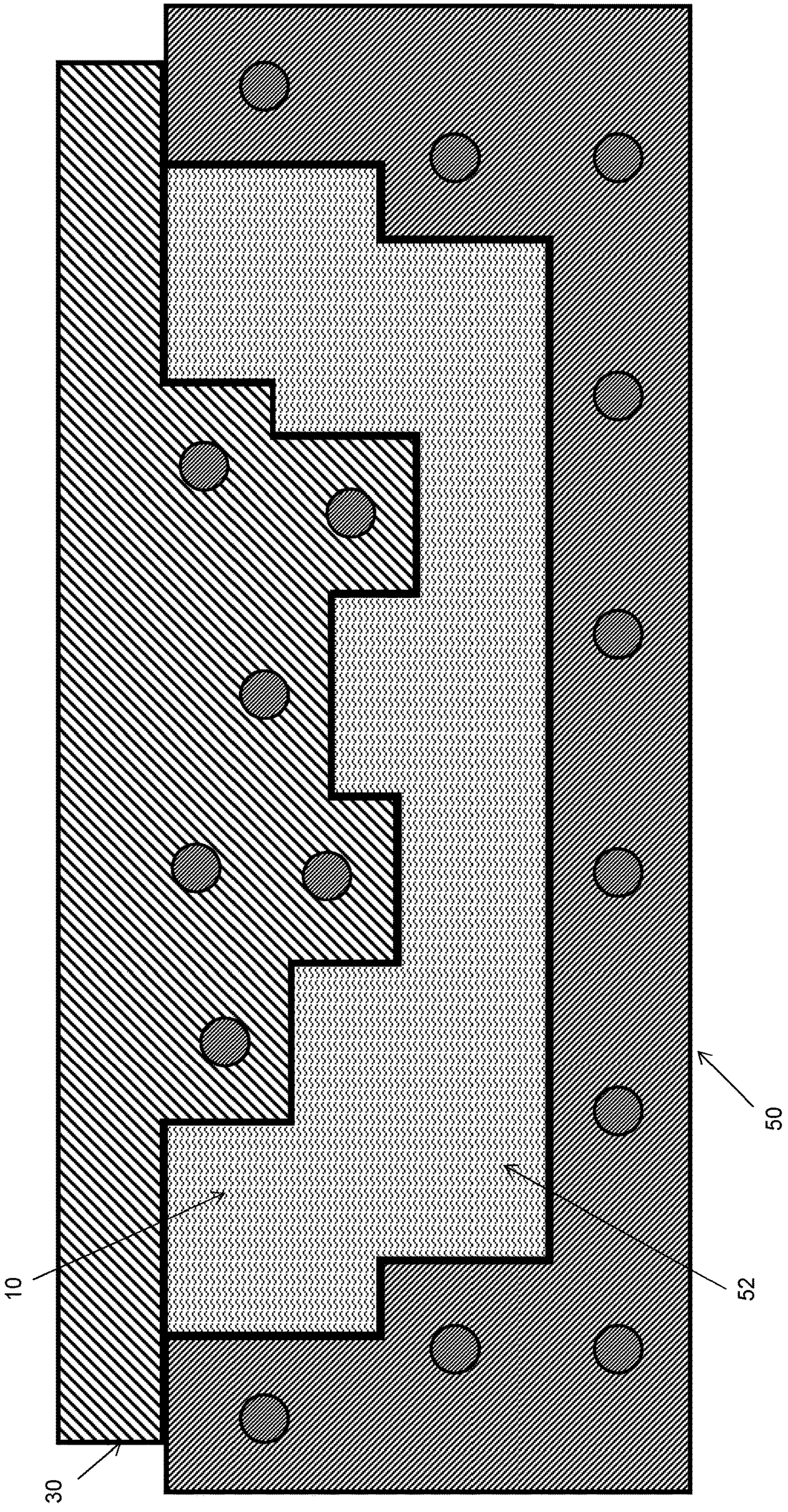
FIG. 5 is a schematic illustration of a male tool and a female tool configured to be used in hot pressing of an air-laid blank to form a 3D shaped packaging product according to an embodiment.

In another embodiment, see FIG. 5, step S1 comprises hot pressing of the heated male tool 30 and a heated female tool 50 into the air-laid blank 10 positioned in between the heated male tool 30 and the heated female tool 50 to form the 3D shaped packaging product 20 having the 3D shape at least partly defined by the male tool 30 and the female tool 50. In this embodiment, the male tool 30 forms a 3D shaped cavity 26 in the formed 3D shaped packaging product 20, whereas the female tool 50 comprises a 3D shaped cavity 52 that defines the outer geometry and 3D shape of the 3D shaped packaging product 20.

In an embodiment, both the male tool 30 and the female tool 50 are heated, preferably to a temperature selected within an interval of from 120° C. up to 210° C., preferably within an interval of from 120° C. up to 190° C. The male tool 30 and the female tool 50 may be heated to the same temperature or to different temperatures. In another embodiment, one of the male tool 30 and the female tool 50 is heated, while the other is at ambient temperature.

Figure 8:
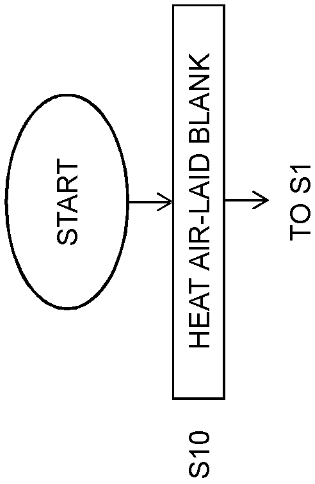
FIG. 8 is a flow chart illustrating an additional, optional step of the method shown in FIG. 7.

In the above presented embodiments, at least one of the tools 30, 50 used in the hot pressing in step S1 is heated. In another embodiment, the method comprises an additional step S10 as shown in FIG. 8. This step S10 comprises heating at least a portion of the air-laid blank 10 prior to hot pressing, in step S1 in FIG. 7, of the male tool 30 into the air-laid blank 10.

Hence, rather than heating the male tool 30 and/or any female tool 50, the air-laid blank 10 is heated, preferably prior to the hot pressing operation. The air-laid blank 10 is then preferably heated to a temperature where the thermoplastic polymer binder, or at least a portion thereof, is in a malleable but not melted state. For most thermoplastic polymer binders this temperature is within an interval of from 80° C. up to 180° C., such as from 100° C. up to 180° C. or from 120° C. up to 160° C. Hence, in an embodiment, the air-laid blank 10 is preferably heated to a temperature within the interval of from 80° C. up to 180° C.

In this embodiment, the male tool 30 and the base platen 40 or female tool 50 may independently be at ambient temperature, such as room temperature, or cooled.

Alternatively, the embodiment shown in FIG. 8, i.e., heating of the air-laid blank 10, could be combined with usage of a heated male tool 30 or a heated male tool 30 and/or a heated female tool 50.

Figure 6:
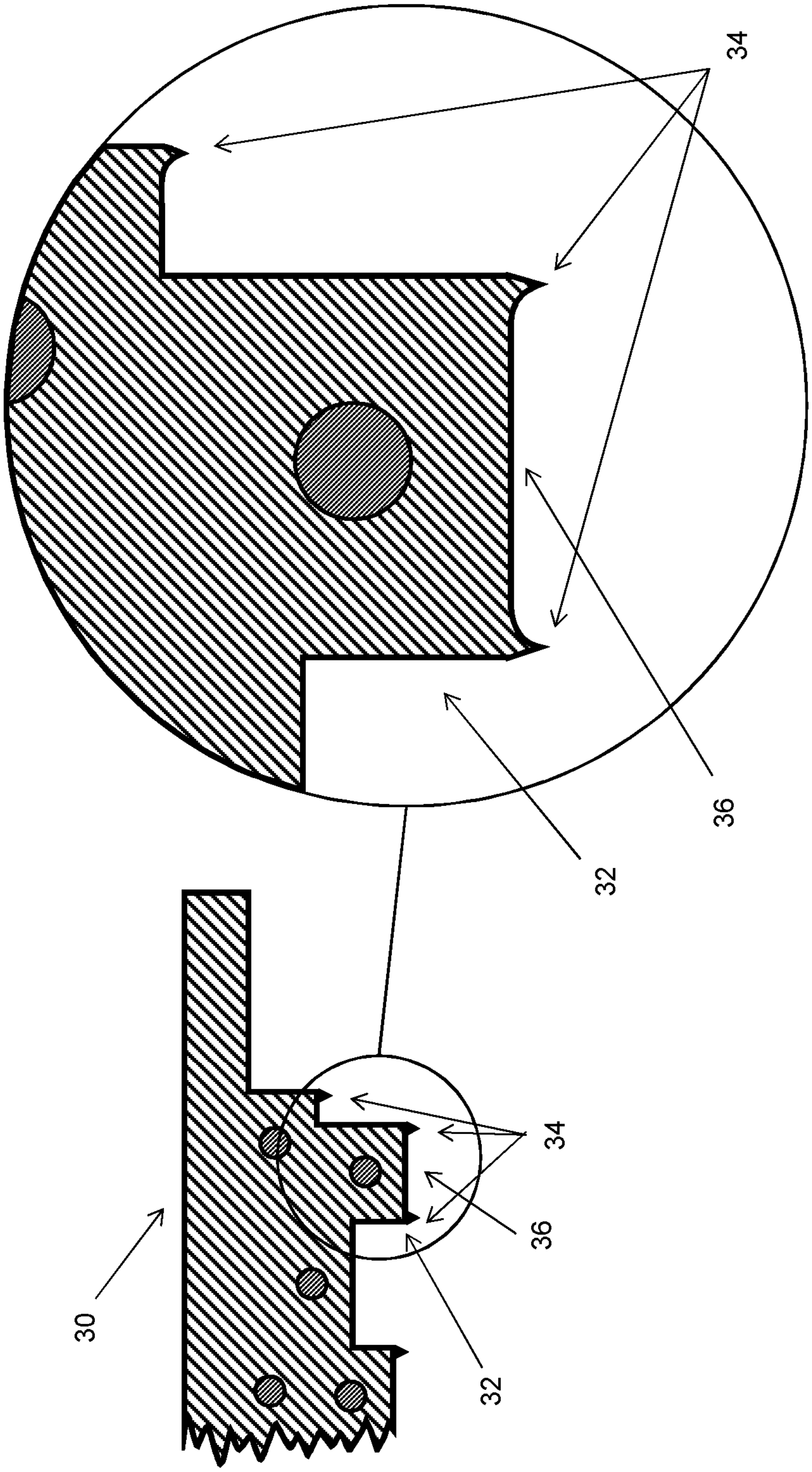
FIG. 6 is an illustration and close-up of a male tool that can be used in hot pressing and cutting of an air-laid blank to form a 3D shaped packaging product.

In an embodiment particularly suitable for producing deep cavities or steep walls, step S1 comprises hot pressing of the male tool 30 comprising at least one cavity-defining structure 32 having a cutting edge 34 into the air-laid blank 10, see FIG. 6. In this embodiment, at least one edge of at least one cavity-defining or protruding structure 32 of the male tool 30 comprises a cutting edge 34. This means that when the male tool 30 is pressed into the air-laid blank 10 in step S1 the at least one cutting edge 34 cuts into the air-laid blank 10. Hence, a simultaneous cutting and pressing operation is achieved. The at least one cutting edge 34 of the at least one cavity-defining structure 32 facilitates forming a well-defined 3D shaped cavity 26 in the formed 3D shaped packaging product 20 and where the cavity 26 is shaped to a desired form, such as to fit a packaged goods in the cavity 26.

The hot pressing in step S1 results in 3D shaped packaging products 20 with substantially preserved porosity to be suitable for cushioning and/or thermal insulation. Accordingly, the male tool 30 cannot be pressed too hard into the air-laid blank 10, which otherwise would lead to too compact and dense 3D shaped packaging products 20. The shape of the cavity 26 in the 3D shaped packaging product 20 can be more accurately well-defined if the male tool 30 not only presses into the air-laid blank 10 but also performs a cutting action simultaneously with the hot pressing.

The cutting edge(s) 34 can be achieved by having sharp edges of the one cavity-defining structure(s) 32 that act similar to the knives or knife edges, whereas the main surface 36 of the at least one cavity-defining structure(s) 32 presses into the air-laid blank 10.

In an embodiment, each edge 34 of all cavity-defining structures 32 of the male tool 30 are in the form of cutting edges 34, or at least a portion thereof.

In an embodiment, the overall 3D shape of the 3D shaped packaging product 20 is at least partly defined by the male tool 30 creating at least one cavity 26 within the 3D shaped packaging product 20 and by the optional female tool 50 that defines at least partly the outer shape of the 3D shaped packaging product 20. The 3D shape and geometries of the 3D shaped packaging product 20 are at least partly selected based on the shape of the packaged goods that should be protected by the 3D shaped packaging product 20 or by the intended use of the 3D shaped packaging product 20, such as in the form of a food container, etc.

The method may also comprise an additional step of cutting the air-laid blank 10 and/or the 3D shaped packaging product 20 into a desired shape, such as by a saw, a cutter, or stamping die. This cutting operation may be performed prior to the hot pressing, simultaneously with the hot pressing and/or after the hot pressing.

In an embodiment, step S1 of FIG. 7 is performed without water. Hence, no water is added during the hot pressing operation. The air-laid blank 10 is preferably at ambient equilibrium moisture content.

The method described above and shown in FIGS. 7 and 8 is suitable to form a 3D shaped packaging product 20 according to the present invention.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A three-dimensional (3D) shaped packaging product for cushioning, or thermal insulation, or both of packaged goods, wherein the 3D shaped packaging product is formed by hot pressing at an average pressure equal to or below 200 kPa of an air-laid blank comprising natural fibers at a concentration of at least 70% by weight of the air-laid blank and a thermoplastic polymer binder at a concentration selected within an interval of from 4 up to 30% by weight of the air-laid blank, wherein the air-laid blank has a thickness of at least 20 mm; and the 3D shaped packaging product having a density that is less than four times a density of the air-laid blank and the density of the 3D shaped packaging product is selected within an interval of from 15 to 240 kg/m$^3$.

2. The 3D shaped packaging product according to claim 1, wherein the natural fibers are wood fibers.

3. The 3D shaped packaging product according to claim 2, wherein the natural fibers are in a form selected from a group consisting of: sulfate pulp, sulfite pulp, thermomechanical pulp (TMP), high temperature thermomechanical pulp (HTMP), mechanical fiber intended for medium density fiberboard (MDF-fiber), chemi-thermomechanical pulp (CTMP), high temperature chemi-thermomechanical pulp (HTCTMP), and a combination thereof.

4. The 3D shaped packaging product according to claim 1, wherein the density of the air-laid blank is selected within an interval of from 10 to 60 kg/m$^3$.

5. The 3D shaped packaging product according to claim 1, wherein the thermoplastic polymer binder, or at least a portion thereof, has a softening point not exceeding a degradation temperature of the natural fibers.

6. The 3D shaped packaging product according to claim 1, wherein the thermoplastic polymer binder comprises mono-component thermoplastic polymer fibers made from i) a material selected from a group consisting of: polyethylene (PE), ethylene acrylic acid copolymer (EAA), ethylene-vinyl acetate (EVA), polypropylene (PP), polystyrene (PS), polybutylene adipate terephthalate (PBAT), polybutylene succinate (PBS), polylactic acid (PLA), polyethylene terephthalate (PET), polycaprolactone (PCL), copolymers thereof and mixtures thereof, and ii) optionally one or more additives.

7. The 3D shaped packaging product according to claim 1, wherein the thermoplastic polymer binder comprises bi-component thermoplastic polymer fibers having a core component, or a sheath component, or both made from i) a material selected from a group consisting of: polyethylene (PE), ethylene acrylic acid copolymer (EAA), ethylene-vinyl acetate (EVA), polypropylene (PP), polystyrene (PS), polybutylene adipate terephthalate (PBAT), polybutylene succinate (PBS), polylactic acid (PLA), polyethylene terephthalate (PET), polycaprolactone (PCL), copolymers thereof and mixtures thereof, and ii) optionally one or more additives.

8. The 3D shaped packaging product according to claim 1, wherein at least a part of the thermoplastic polymer binder is water soluble at a repulping temperature selected for repulping the 3D shaped packaging product.

9. The 3D shaped packaging product according to claim 1, wherein the thermoplastic polymer binder comprises mono-component thermoplastic polymer fibers made from i) a material selected from a group consisting of: polyvinyl alcohol (PVA), polyethylene glycol (PEG), poly(2-ethyl-2-oxazoline) (PEOX), polyvinyl ether (PVE), polyvinylpyrrolidone (PVP), polyacrylic acid (PAA), polymethacrylic acid (PMAA), copolymers thereof and mixtures thereof, and ii) optionally one or more additives.

10. The 3D shaped packaging product according to claim 1, wherein the thermoplastic polymer binder comprises bi-component thermoplastic polymer fibers having a core component, or a sheath component, or both made from i) a material selected from a group consisting of polyvinyl alcohol (PVA), polyethylene glycol (PEG), poly(2-ethyl-2-oxazoline) (PEOX), polyvinyl ether (PVE), polyvinylpyrrolidone (PVP), polyacrylic acid (PAA), polymethacrylic acid (PMAA), copolymers thereof and mixtures thereof, and ii) optionally one or more additives.

11. The 3D shaped packaging product according to claim 1, wherein the thermoplastic polymer binder comprises bi-component thermoplastic polymer fibers comprising:

a core component made from i) a material selected from a group consisting of: polyethylene (PE), ethylene acrylic acid copolymer (EAA), ethylene-vinyl acetate (EVA), polypropylene (PP), polystyrene (PS), polybutylene adipate terephthalate (PBAT), polybutylene succinate (PBS), polylactic acid (PLA), polyethylene terephthalate (PET), polycaprolactone (PCL), copolymers thereof and mixtures thereof, and ii) optionally one or more additives; and a sheath component made from i) a material selected from a group consisting of: polyvinyl alcohol (PVA), polyethylene glycol (PEG), poly(2-ethyl-2-oxazoline) (PEOX), polyvinyl ether (PVE), polyvinylpyrrolidone (PVP), polyacrylic acid (PAA), polymethacrylic acid (PMAA), copolymers thereof and mixtures thereof, and ii) optionally one or more additives.

12. The 3D shaped packaging product according to claim 1, wherein the thermoplastic polymer binder comprises thermoplastic polymer fibers having a length weighted average fiber length that is selected within an interval of from 100 up to 600% of a length weighted average fiber length of the natural fibers.

13. The 3D shaped packaging product according to claim 1, wherein the thermoplastic polymer binder comprises thermoplastic polymer fibers having a length weighted average fiber length that is selected within an interval of from 1 up to 12 mm.

14. The 3D shaped packaging product according to claim 1, wherein the 3D shaped packaging product comprises at least one surface that is heat sealed to inhibit linting from the at least one surface.

15. The 3D shaped packaging product according to claim 1, wherein the 3D shaped packaging product comprises at least one surface coated with a surface layer selected from a group consisting of: a linting inhibiting layer, a moisture barrier layer, a haptic layer, and a colored layer.

16. The 3D shaped packaging product according to claim 15, wherein the surface layer is attached to the at least one surface of the 3D shaped packaging product by a hotmelt glue, or by an adhesive film, or by both.

17. A method for manufacturing a three-dimensional (3D) shaped packaging product for cushioning, or thermal insulation, or both of packaged goods, the method comprising:

hot pressing at an average pressure equal to or below 200 kPa of a male tool into an air-laid blank comprising natural fibers at a concentration of at least 70% by weight of the air-laid blank and a thermoplastic polymer binder at a concentration selected within an interval of from 4 up to 30% by weight of the air-laid blank to form the 3D shaped packaging product having a 3D shape at least partly defined by the male tool, wherein the air-laid blank has a thickness of at least 20 mm, and, wherein the 3D shaped packaging product has a density that is less than four times a density of the air-laid blank and the density of the 3D shaped packaging product is selected within an interval of from 15 to 240 kg/m$^3$.

18. The method according to claim 17, wherein hot pressing of the male tool comprises hot pressing of a heated male tool into the air-laid blank.

19. The method according to claim 18, wherein hot pressing of the heated male tool comprises hot pressing of the heated male tool into the air-laid blank positioned on a base platen having a temperature equal to or below ambient temperature.

20. The method according to claim 17, wherein hot pressing of the male tool comprises hot pressing of the male tool and a female tool into the air-laid blank positioned in between the male tool and the female tool to form the 3D shaped packaging product having the 3D shape at least partly defined by the male tool and the female tool, at least one of the male tool and the female tool being heated.

21. The method according to claim 17, further comprising heating at least a portion of the air-laid blank prior to hot pressing of the male tool into the air-laid blank.

22. The method according to claim 17, wherein hot pressing of the male tool comprises hot pressing of the male tool comprising at least one cavity-defining structure having a cutting edge into the air-laid blank.

* * * * *